(12) United States Patent
Cao et al.

(10) Patent No.: US 8,958,272 B1
(45) Date of Patent: Feb. 17, 2015

(54) INTERFERING NEAR FIELD TRANSDUCER FOR ENERGY ASSISTED MAGNETIC RECORDING

(71) Applicant: Western Digital (Fremont), LLC, Fremont, CA (US)

(72) Inventors: Jiangrong Cao, Fremont, CA (US); Michael V. Morelli, San Jose, CA (US); Brad V. Johnson, Santa Clara, CA (US); Matthew R. Gibbons, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/324,466

(22) Filed: Jul. 7, 2014

Related U.S. Application Data

(60) Provisional application No. 62/010,038, filed on Jun. 10, 2014.

(51) Int. Cl.
*G11B 11/00* (2006.01)
*G11B 5/48* (2006.01)
*G11B 5/00* (2006.01)

(52) U.S. Cl.
CPC ...... *G11B 5/4866* (2013.01); *G11B 2005/0021* (2013.01)
USPC ........................................ 369/13.33

(58) Field of Classification Search
None
See application file for complete search history.

(56) References Cited

U.S. PATENT DOCUMENTS

| | | | |
|---|---|---|---|
| 5,199,090 A * | 3/1993 | Bell | ............................... 369/300 |
| 6,016,290 A | 1/2000 | Chen et al. | |
| 6,018,441 A | 1/2000 | Wu et al. | |
| 6,025,978 A | 2/2000 | Hoshi et al. | |
| 6,025,988 A | 2/2000 | Yan | |
| 6,032,353 A | 3/2000 | Hiner et al. | |
| 6,033,532 A | 3/2000 | Minami | |
| 6,034,851 A | 3/2000 | Zarouri et al. | |
| 6,043,959 A | 3/2000 | Crue et al. | |
| 6,046,885 A | 4/2000 | Aimonetti et al. | |
| 6,049,650 A | 4/2000 | Jerman et al. | |
| 6,055,138 A | 4/2000 | Shi | |
| 6,058,094 A | 5/2000 | Davis et al. | |
| 6,073,338 A | 6/2000 | Liu et al. | |
| 6,078,479 A | 6/2000 | Nepela et al. | |
| 6,081,499 A | 6/2000 | Berger et al. | |

(Continued)

OTHER PUBLICATIONS

Jiangrong Cao, et al., U.S. Appl. No. 14/324,505, filed Jul. 7, 2014, 15 pages.

(Continued)

*Primary Examiner* — Thang Tran

(57) ABSTRACT

An apparatus for energy assisted magnetic recording of a storage disk includes a plurality of dielectric waveguide cores configured to receive incident light energy from an energy source and direct the incident light energy to a target, and a near field transducer (NFT) formed at an air bearing surface of a magnetic recording device. The NFT is configured to focus the light energy received from the plurality of waveguide cores and to transmit the focused light energy onto the storage disk surface to generate a heating spot on the storage disk. The NFT includes a plurality of propagating surface plasmon polariton (PSPP) elements configured as plasmonic metal ridges. Each of the PSPP elements has a width approximately equivalent to the width of the heating spot and is disposed above a surface of a single waveguide core in a longitudinal alignment.

13 Claims, 5 Drawing Sheets

(56) References Cited

U.S. PATENT DOCUMENTS

| | | | |
|---|---|---|---|
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |

(56) References Cited

U.S. PATENT DOCUMENTS

| | | |
|---|---|---|
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 6,999,384 B2 | 2/2006 | Stancil et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |

(56) References Cited

U.S. PATENT DOCUMENTS

| | | | |
|---|---|---|---|
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,705,280 B2 | 4/2010 | Nuzzo et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 * | 12/2011 | Hu et al. ................. 369/13.24 |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,098,547 B2 | 1/2012 | Komura et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,134,894 B2 | 3/2012 | Kitazawa et al. |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,149,654 B2 | 4/2012 | Komura et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,170,389 B1 | 5/2012 | Komura et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,358,407 B2 | 1/2013 | Hu et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,395,973 B2 | 3/2013 | Kitazawa et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |

(56) References Cited

U.S. PATENT DOCUMENTS

| | | |
|---|---|---|
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,488,419 B1 | 7/2013 | Jin et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,398 B2 | 8/2013 | Pang et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 * | 3/2014 | Shi et al. .................... 369/13.24 |
| 8,670,295 B1 | 3/2014 | Hu et al. |
| 8,674,328 B2 | 3/2014 | Fourkas et al. |
| 8,675,318 B1 | 3/2014 | Ho et al. |
| 8,675,455 B1 * | 3/2014 | Krichevsky et al. ....... 369/13.24 |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 2007/0146866 A1 | 6/2007 | Wright |
| 2007/0289623 A1 | 12/2007 | Atwater |
| 2008/0130155 A1 * | 6/2008 | Naniwa et al. ................... 360/59 |
| 2008/0158563 A1 | 7/2008 | Berini et al. |
| 2009/0262608 A1 * | 10/2009 | Kurita et al. ................ 369/13.33 |
| 2010/0290157 A1 | 11/2010 | Zhang et al. |
| 2011/0038235 A1 * | 2/2011 | Matsumoto et al. ........ 369/13.17 |
| 2011/0086240 A1 | 4/2011 | Xiang et al. |
| 2011/0215705 A1 | 9/2011 | Long et al. |
| 2011/0216635 A1 * | 9/2011 | Matsumoto ................. 369/13.33 |
| 2012/0111826 A1 | 5/2012 | Chen et al. |
| 2012/0119117 A1 | 5/2012 | Fourkas et al. |
| 2012/0125430 A1 | 5/2012 | Ding et al. |
| 2012/0155232 A1 | 6/2012 | Schreck et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2012/0305772 A1 | 12/2012 | Tripodi et al. |
| 2013/0108212 A1 * | 5/2013 | Peng et al. ....................... 385/15 |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |

OTHER PUBLICATIONS

Jiangrong Cao, et al., U.S. Appl. No. 14/324,294, filed Jul. 7, 2014, 18 pages.

(56) References Cited

OTHER PUBLICATIONS

Jiangrong Cao, et al., U.S. Appl. No. 14/324,303, filed Jul. 7, 2014, 21 pages.

J. N. Casper, etal, "Compact hybrid plasmonic polarization rotator," Optics Letters 37(22), 4615 (2012).

J. N. Casper, etal, "Experimental demonstration of an integrated hybrid plasmonic polarization rotator," Optics Letters 38(20), 4054 (2013).

L Gao, etal, "Ultra-Compact and Low-Loss Polarization Rotator Based on Asymmetric Hybrid Plasmonic Waveguide," IEEE Photonics Technology Letters 25(21), 2081 (2013).

Yunchuan Kong, M. Chabalko, E. Black, S. Powell, J. A. Bain, T. E. Schlesinger, and Yi Luo, "Evanescent Coupling Between Dielectric and Plasmonic Waveguides for HAMR Applications," IEEE Transactions on Magnetics, vol. 47, No. 10, p. 2364-7, Oct. 2011.

Maxim L. Nesterov, Alexandre V. Kats and Sergei K. Turitsyn, "Extremely short-length surface plasmon resonance devices," Optics Express 16(25), 20227, (Dec. 2008).

J. Mu, et. al., "Hybrid nano ridge plasmonic polaritons waveguides," Applied Physics Letters 103, 131107 (2013).

R. F. Oulton, et. al., "A hybrid plasmonic waveguide for subwavelength confinement and long-range propagation," Nature Photonics, vol. 2, 496-500 (Aug. 2008).

R. F. Oulton, et. al., "Confinement and propagation characteristics of subwavelength plasmonic modes," New Journal of Physics, vol. 10, 105018 (Oct. 2008).

S. Somekh, E. Garmire, A. Yariv, H.L.Gavin, and R. G. Hunsperger, "Channel optical waveguide directional couplers," Appl. Phys. Lett 22, 46 (1973).

Amnon Yariv, Optical Electronics in Modern Communications (5th edition), Oxford University Press (1997), pp. 522.

\* cited by examiner

… (1)

INTERFERING NEAR FIELD TRANSDUCER FOR ENERGY ASSISTED MAGNETIC RECORDING

CROSS-REFERENCE TO RELATED APPLICATION

This application claims the benefit of U.S. Provisional Application Ser. No. 62/010,038 filed on Jun. 10, 2014, which is expressly incorporated by reference herein in its entirety.

BACKGROUND

High density storage disks are configured with layers of materials that provide the required data stability for storage. The magnetic properties of the media require a softening when writing to the disk to change the bit state. Energy Assisted Magnetic Recording (EAMR) device or Heat Assisted Magnetic Recording (HAMR) technology provides heat that is focused on a nano-sized bit region when writing onto a magnetic storage disk, which achieves the magnetic softening. A light waveguide directs light from a laser diode to a near field transducer (NFT). The NFT focuses the optical energy to a small spot on the target recording area which heats the magnetic storage disk during a write operation. Inefficiencies in the NFT can have a negative impact on the power budget of the laser diode and the EAMR/HAMR system lifetime. Higher NFT efficiency allows for lower laser power demand, relieving EAMR/HAMR system requirement on the total optical power from the laser source, and results in less power for parasitic heating of the EAMR/HAMR head resulting for improved reliability.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
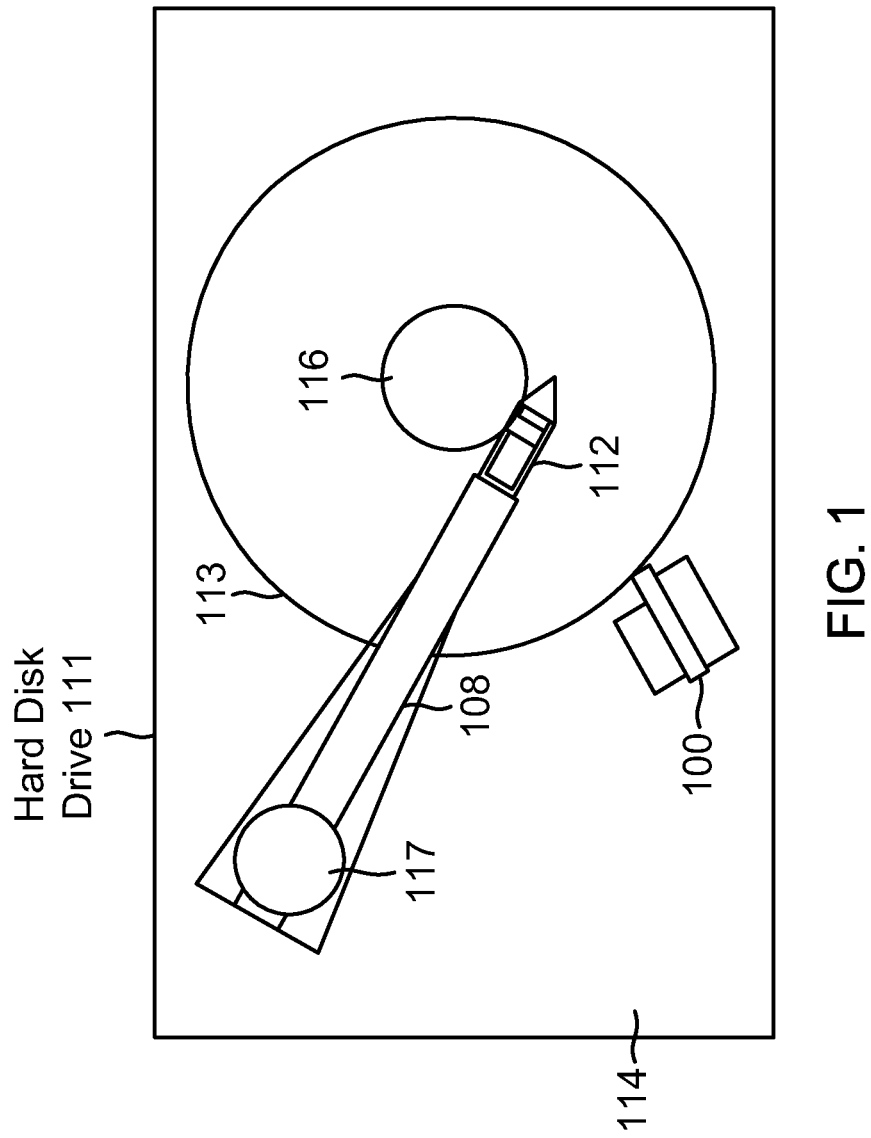
FIG. 1 shows a diagram of an exemplary hard disk drive.

The detailed description set forth below in connection with the appended drawings is intended as a description of various exemplary embodiments and is not intended to represent the only embodiments that may be practiced. The detailed description includes specific details for the purpose of providing a thorough understanding of the embodiments. However, it will be apparent to those skilled in the art that the embodiments may be practiced without these specific details. In some instances, well-known structures and components are shown in block diagram form in order to avoid obscuring the concepts of the embodiments. Acronyms and other descriptive terminology may be used merely for convenience and clarity and are not intended to limit the scope of the embodiments.

The various exemplary embodiments illustrated in the drawings may not be drawn to scale. Rather, the dimensions of the various features may be expanded or reduced for clarity. In addition, some of the drawings may be simplified for clarity. Thus, the drawings may not depict all of the components of a given apparatus.

Various embodiments will be described herein with reference to drawings that are schematic illustrations of idealized configurations. As such, variations from the shapes of the illustrations as a result of manufacturing techniques and/or tolerances, for example, are to be expected. Thus, the various embodiments presented throughout this disclosure should not be construed as limited to the particular shapes of elements illustrated and described herein but are to include deviations in shapes that result, for example, from manufacturing. By way of example, an element illustrated or described as having rounded or curved features at its edges may instead have straight edges. Thus, the elements illustrated in the drawings are schematic in nature and their shapes are not intended to illustrate the precise shape of an element and are not intended to limit the scope of the described embodiments.

The word "exemplary" is used herein to mean serving as an example, instance, or illustration. Any embodiment described herein as "exemplary" is not necessarily to be construed as preferred or advantageous over other embodiments. Likewise, the term "embodiment" of an apparatus or method does not require that all embodiments include the described components, structure, features, functionality, processes, advantages, benefits, or modes of operation.

As used herein, the term "about" followed by a numeric value means within engineering tolerance of the provided value.

In the following detailed description, various aspects of the present invention will be presented in the context of an interface between a waveguide and a near field transducer used for heat assisted magnetic recording on a magnetic storage disk.

FIG. 1 shows a hard disk drive 111 including a disk drive base 114, at least one rotatable storage disk 113 (e.g., such as a magnetic disk, magneto-optical disk), and a spindle motor 116 attached to the base 114 for rotating the disk 113. The spindle motor 116 typically includes a rotating hub on which one or more disks 113 may be mounted and clamped, a magnet attached to the hub, and a stator. At least one suspension arm 108 supports at least one head gimbal assembly (HGA) 112 that holds a slider with a magnetic head assembly of writer and reader heads. A ramp assembly 100 is affixed to the base 114, and provides a surface for tip of the suspension arm 108 to rest when the HGA 112 is parked (i.e., when the writer and reader heads are idle). During a recording operation of the disk drive 111, the suspension arm 108 rotates at the pivot 117, disengaging from the ramp assembly 100, and moves the position of the HGA 112 to a desired information track on the rotating storage disk 113. During recording, the slider is suspended by the HGA 112 with an air bearing surface of the slider that faces the rotating disk 113, allowing the writer head to magnetically alter the state of the storage bit. For heat assisted magnetic recording, a near field transducer (NFT) on the air bearing surface may couple light energy from a waveguide to produce a heating spot on the rotating disk 113 for magnetically softening the bit space.

Figure 2:
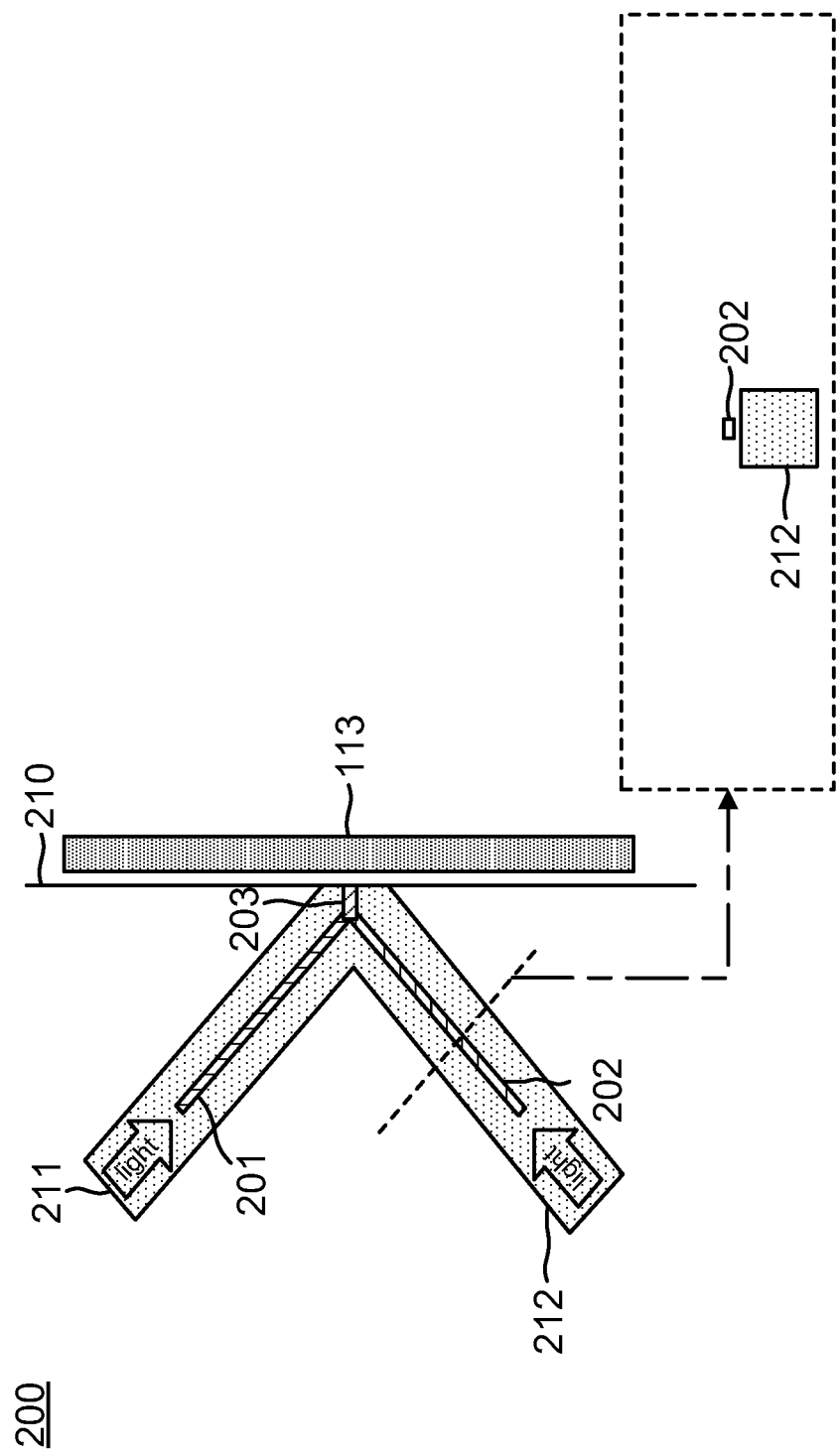
FIG. 2 shows a diagram of an exemplary embodiment of a near field transducer formed with two propagating surface plasmon polariton elements.

FIG. 2 shows a diagram of an exemplary embodiment of an NFT 200 arranged at an air bearing surface (ABS) 210 of a slider which carries a magnetic head assembly. The ABS 210 is the surface of the slider facing the storage disk 113. As the slider flies over the storage disk 113, a cushion of air is maintained between the slider and the disk 113. As shown, two dielectric waveguide (WG) cores 211, 212 are arranged to each carry light energy into the NFT 200 directed toward a common target. The light energy may be generated by a common laser diode source (not shown) that may be split in half by a splitter (not shown). The dielectric waveguide cores 211, 212 may be of equal length to ensure that the combined energy wave at the ABS 210 is in substantial phase alignment for constructive interference and maximum energy emission to the storage disk 113. Alternatively, dielectric waveguide cores 211, 212 may be of unequal length such that the incident energy waves may have a particular phase difference that optimizes constructive interference and maximum energy magnitude at the ABS 210. The two waveguide cores 211, 212 are substantially linear and converge at a junction near the ABS 210 at an interior angle between 0 and 180 degrees, (e.g., approximately 90 degrees as shown in FIG. 2). The dielectric material of the waveguide core 211, 212 may be $Ta_2O_5$ for example.

As shown in FIG. 2, a plasmonic metal ridge element 201, 202 may be disposed above each waveguide core 211, 212 in a longitudinal direction along the center the waveguide core surface. The optical energy from the dielectric waveguide core 211, 212 in proximity with of the plasmonic metal ridge 201, 202 energizes propagating surface plasmon polaritons (PSPPs) along a surface of the plasmonic metal ridge 201, 202 toward the ABS 210. Thus, each plasmonic metal ridge element 201, 202 may function as a PSPP element. The material of the plasmonic metal ridge element 201, 202 may be a gold alloy, for example. Other examples of plasmonic metals that may be used to form the metal ridge element 201, 202 include silver or copper alloys. As shown in the cross section, a gap (e.g., about 20 nm) may exist between the plasmonic metal ridge element 201, 202 and the dielectric waveguide core 211, 212. Alternatively, the gap may be omitted, and the plasmonic metal ridge element 201, 202 may directly contact the dielectric waveguide core 211, 212, at least for a portion of the plasmonic metal ridge element 201, 202. The two dielectric waveguide cores 211, 212 and the entire NFT 200, including the two plasmonic metal ridges 201, 202, may be encapsulated by a silicon oxide material. The plasmonic metal ridge elements 201, 202 may thus be suspended above the dielectric waveguide cores 211, 212 within the waveguide cladding and/or slider substrate material.

The plasmonic metal ridge elements 201, 202 may be configured as shown in FIG. 2, converging at a junction above the junction of the dielectric waveguide cores 211, 212. The junction of plasmonic metal ridge elements 201, 202 may occur on a common plane, or may be formed by overlapping one element over the other element. As shown, a single metal ridge extension 203 may be formed and configured to be perpendicular with the ABS 210, extending from the junction of plasmonic metal ridge elements 201, 202. This extension 203 may provide a focal point for the NFT 200 energy output at the ABS 210 for heating the target bit space for recording data. For example, the endpoint of the extension 203 may function as an emitter for the NFT 200 energy output. Alternatively, the extension 203 may be omitted, and the junction of plasmonic metal ridge elements 201, 202 may be formed at the ABS 210. For example, an NFT energy output emitter may be formed at the ABS 210 by the exposed metal ridge junction at the ABS 210, from which the maximum energy is propagated across the air cushion and onto the surface of storage disk 113. The physical dimension of the emitter (i.e., the width of the exposed junction of plasmonic metal ridge elements 201, 202 or extension 203) may be approximately equivalent to the size of the focused heating spot on the surface of the disk 113. The target size of the heating spot is dependent on the track size as the slider flies over the track, which may be about 10-70 nm wide for example. The size of the heating spot also depends on the distance between the ABS 210 and the disk 113. The focus of the heating spot may be optimized by minimizing the gap. The width of the plasmonic metal ridge element 201, 202 may also be significantly smaller than the width of the dielectric waveguide core (e.g., 300-500 nm). Also, the height of the metal ridge element 201, 202 may be about 10-70 nm for example.

The two PSPP element configuration as shown in FIG. 2 may provide approximately twice as much electrical field magnitude compared with a configuration of a single PSPP element arranged perpendicular to the ABS 210, driven by a common total input power in the waveguide system. The constructive interference produced by the two PSPP elements 201, 202 allows improved efficiency of energy delivery from the laser diode source, which translates to longer service life of the EAMR/HAMR device. To optimize the efficiency of the two PSPP element configuration, each PSPP element 201, 202 is configured with a length L which is an integer multiple of coupling length Lc from dielectric waveguide core to the PSPP element 201, 202 (e.g., for Lc of 1200 nm, the length of the PSPP element should be about a(1200 nm) where a is an integer value). With the PSPP element 201, 202 having a length L approximately equivalent to aLc ensures that the maximum energy transfer propagates from the PSPP element 201, 202 at the ABS 210. If the length of the PSPP element 201, 202 deviates from aLc, some of the energy wave may be lost to the dielectric waveguide core 211, 212.

The NFT 200 does not have to be limited to two interfering PSPP elements 201, 202 as shown in FIG. 2. In an alternative embodiment, N (a positive integer) PSPP elements interfere at the ABS, which may provide approximately N times increase of the electrical field magnitude, driven by a common total input power in the waveguide system. The value of N can increase beyond 2 or 3, until other parasitic interferences within the three dimensional layout the EAMR head becomes a limiting factor. For N≥3, the PSPP elements may be arranged in a three dimensional configuration.

Figure 3:
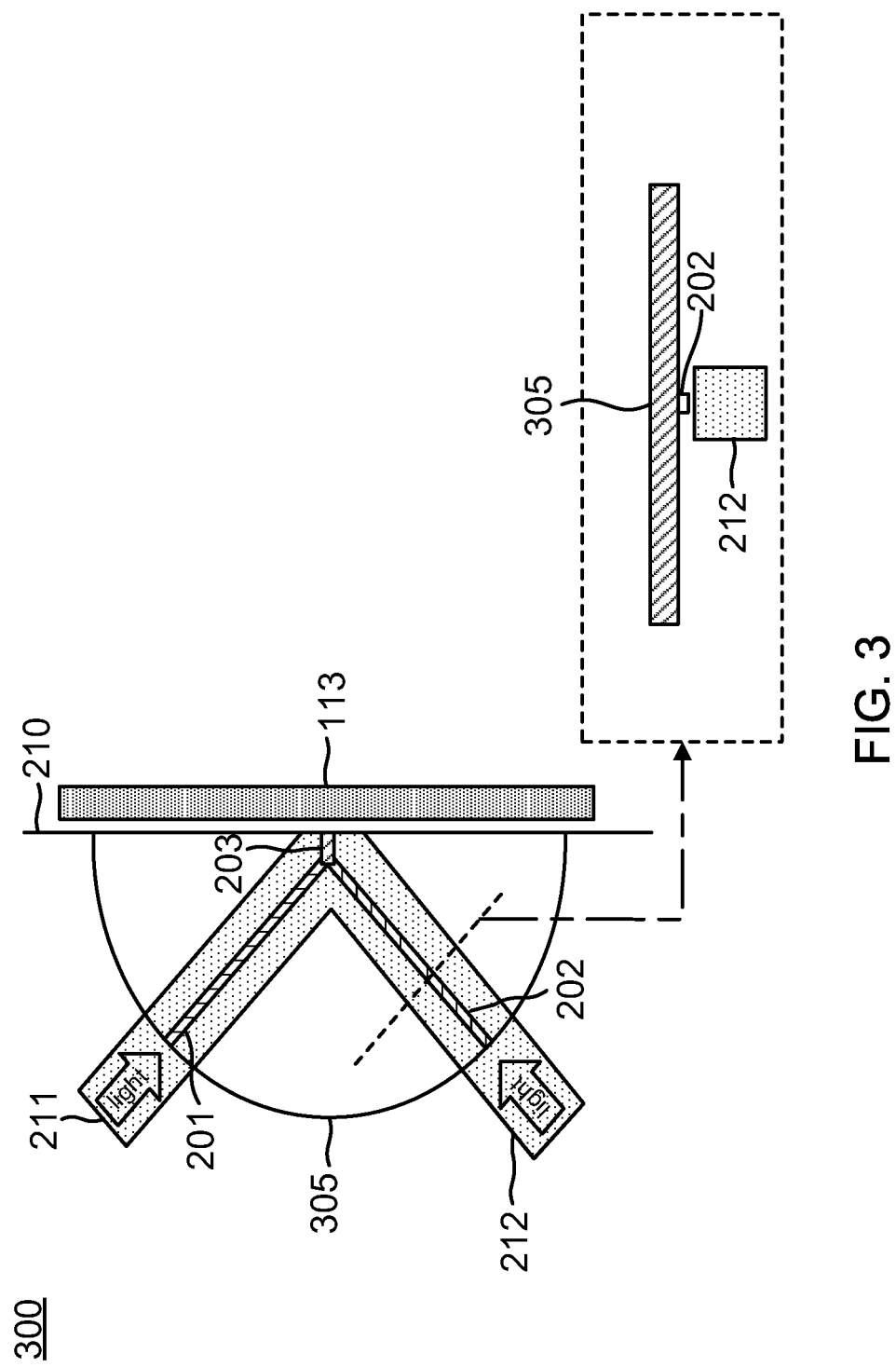
FIG. 3 shows a diagram of an exemplary embodiment of a near field transducer with two propagating surface plasmon polariton elements and a plasmonic metal cap.

FIG. 3 shows an alternative exemplary arrangement for an NFT 300, which is a variation of NFT 200 with an additional plasmonic metal cap 305. As shown in FIG. 3, the NFT 300 may include the plasmonic metal ridge elements 202, 203 coupled to a plasmonic metal cap 305 above. For illustrative purpose, the plasmonic metal element 305 is depicted as transparent to reveal the fine ridge features 201, 202 below. The plasmonic metal cap 305 is shown in a semi-circle configuration with a straight edge substantially aligned with the ABS 210. The aligned edge of the plasmonic metal cap 305 may be recessed from the ABS 210. The material of the plasmonic metal ridge elements 201, 202 and the plasmonic metal cap 305 may be a gold alloy, for example. Other examples of plasmonic metals that may be used to form the metal ridge elements 201, 202 and plasmonic metal cap include silver or copper alloys. The two dielectric waveguide cores 211, 212 and the entire NFT 200, including the plasmonic metal cap 305 and two plasmonic metal ridges 201, 202, may be encapsulated by a silicon oxide material.

The thickness of the plasmonic metal cap 305 is not a significant factor in achieving the precise nano-sized heating spot, and therefore the thickness may be configured according to providing adequate heat transfer for controlling the peak temperature in the NFT 300. The plasmonic metal element 305 configuration is determined by a shape and size necessary to be coupled with the metal ridge features 201, 202 (i.e., a footprint that covers the metal ridge features 201, 202). As an example, the size of a semi-circle shaped plasmonic metal element 305 may be 1000 nm in diameter and greater than 100 nm in thickness. The surface of the plasmonic metal cap 305 may be configured to have a substantially flat surface facing the metal ridge features for coupling, while the opposite surface may be flat, rounded or irregular such that the overall thickness is variable. While shown in FIG. 3 as a semi-circle shape, the plasmonic metal cap 305 may be configured in shapes other than a semi-circle, such as a rectangular or polygonal block.

The NFT 300 does not have to be limited to two interfering PSPP elements 201, 202 as shown in FIG. 3. In an alternative embodiment, N (a positive integer) PSPP elements interfere at the ABS, which may provide approximately N times increase of the electrical field magnitude. The value of N can increase beyond 2 or 3, until other parasitic interferences within the three dimensional layout the EAMR head becomes a limiting factor. For N≥3, the PSPP elements may be arranged in a three dimensional configuration. The plasmonic metal cap 305 would also conform to a corresponding three dimensional configuration as being coupled to the N PSPP elements from above.

Figure 4:
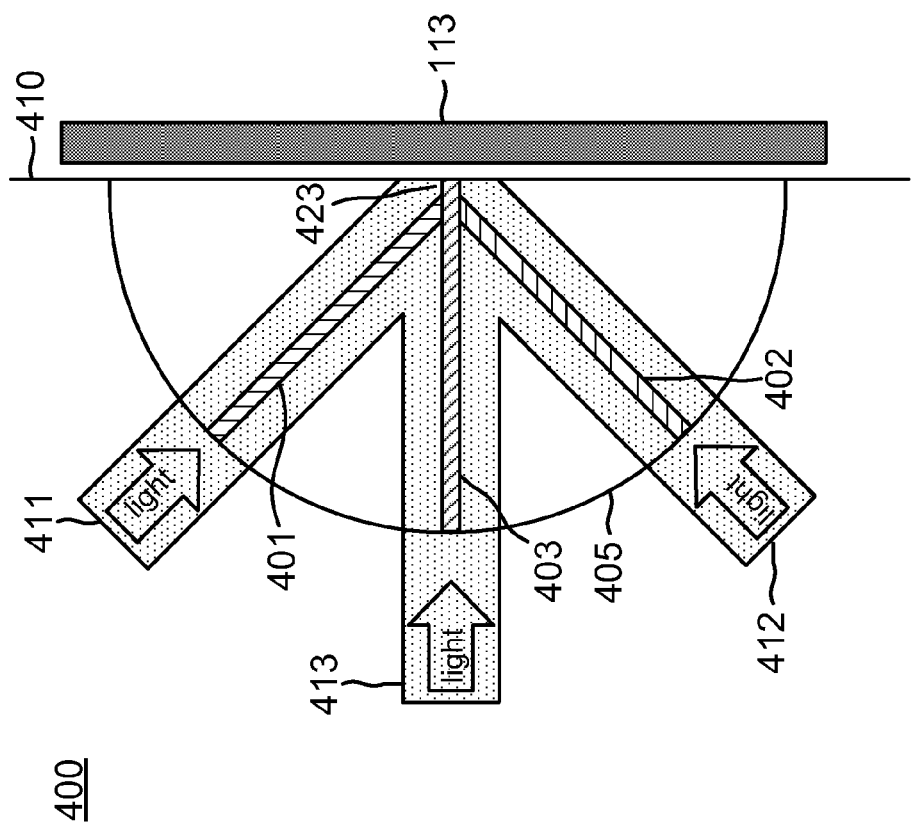
FIG. 4 shows a diagram of an exemplary embodiment of a near field transducer formed with three propagating surface plasmon polariton elements.

FIG. 4 shows an alternative exemplary arrangement for an NFT 400 having N=3 PSPP elements. Each PSPP element is formed in a manner similar to that described above for the two-PSPP element configuration shown in FIG. 4 and described above. The NFT 400 may include a plasmonic metal cap 405 and plasmonic metallic ridge elements 401, 402, 403 arranged above each respective dielectric waveguide core 411, 412, 413 as shown in FIG. 4. For illustrative purpose, the plasmonic metal element 405 is depicted as transparent to reveal the fine ridge features 401, 402, 403 below. A gap may exist between each plasmonic metal ridge element 401, 402, 403 and the respective dielectric waveguide core 411, 412, 413. The three dielectric waveguide cores 411, 412, 413 and the entire NFT 400, including the plasmonic metal cap 405 and three plasmonic metal ridge elements 401, 402, 403, may be encapsulated by silicone oxide material. The plasmonic metal ridge elements 401, 402, 403 may be configured as shown in FIG. 4, converging at a junction above the junction of the dielectric waveguide cores 411, 412, 413. The junction of plasmonic metal ridge elements 401, 402, 403 may occur on a common plane, or may be formed by overlapping one element over the other elements. As shown, a single metal ridge extension 423 may be formed and configured to be perpendicular with the ABS 410, extending from the junction of plasmonic metal ridge elements 401, 402, 403. This extension 423 may provide a focal point for the NFT energy output at the ABS 410 for heating the target bit space for recording data. Alternatively, the extension 423 may be omitted, and the junction of the three plasmonic metal ridge elements 401, 402, 403 may be formed at the ABS 410. For example, an NFT energy output emitter may be formed at the ABS 410 by the exposed plasmonic metal ridge junction at the ABS 410, from which the maximum energy is propagated across the air cushion and onto the surface of the storage disk 113. The physical dimension of the emitter (i.e., the width of the exposed plasmonic metal ridge junction or extension) may be approximately equivalent to the size of the focused heating spot on the surface of the disk 113. This embodiment of NFT 400 may alternatively be configured without plasmonic metal cap 405.

Figure 5:
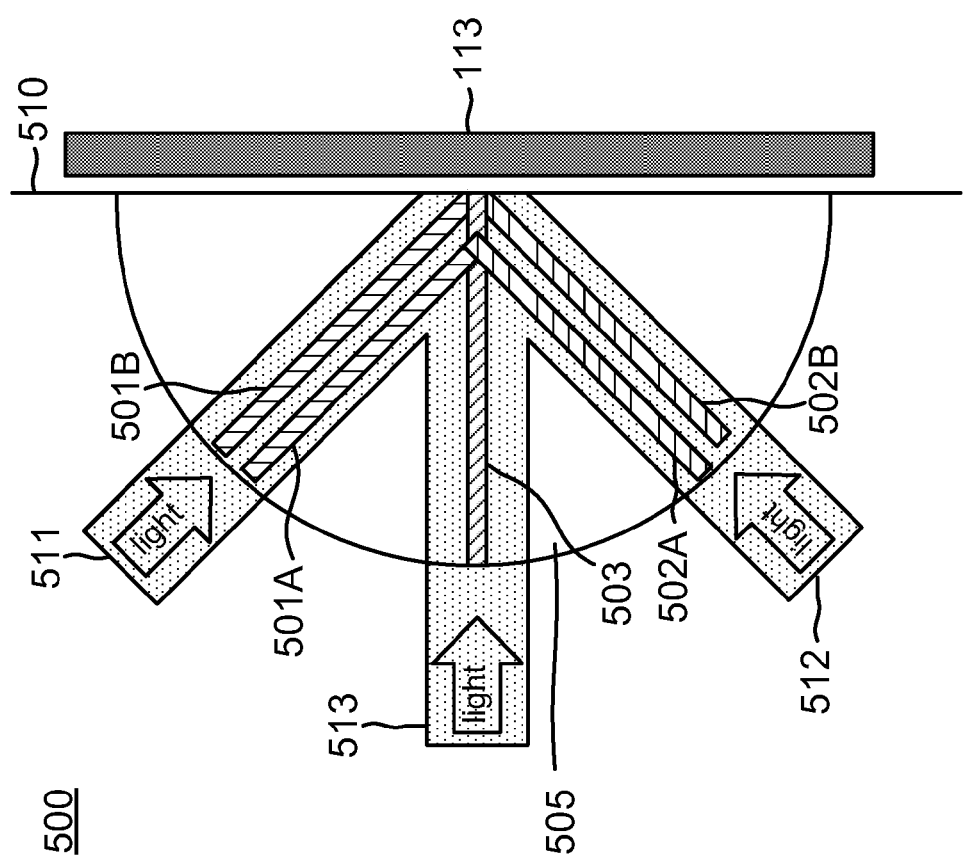
FIG. 5 shows a diagram of an exemplary embodiment of a near field transducer formed with a plurality of propagating surface plasmon polariton elements that is not equal in number to a plurality of corresponding waveguide cores.

The number of PSPP elements may vary with respect to the number of dielectric waveguide cores. FIG. 5 illustrates an example where two PSPP elements 501A, 501B may be disposed side-by-side above a single dielectric waveguide core 511. Similarly, PSPP elements 502A, 502B may be disposed side-by-side above a single dielectric waveguide core 512. In this example, NFT power delivery efficiency is increased by five interfering PSPP elements 501A, 501B, 502A, 502B, 503 while using only three dielectric waveguide cores 511, 12, 513. As shown in FIG. 5, the NFT 500 may include the plasmonic metal cap 505 disposed above the PSPP elements 501A, 501B, 502A, 502B and 503. This embodiment of NFT 500 may alternatively be configured without plasmonic metal cap 505.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

What is claimed is:

1. An apparatus for energy assisted magnetic recording of a storage disk, comprising:
   a plurality of dielectric waveguide cores configured to receive incident light energy from an energy source and direct the incident light energy to a target; and
   a near field transducer formed at an air bearing surface of a magnetic recording device and configured to focus the light energy received from the plurality of waveguide cores and to transmit the focused light energy onto the storage disk surface to generate a heating spot on the storage disk, the near field transducer comprising:
      a plurality of propagating surface plasmon polariton (PSPP) elements configured as plasmonic metal ridges;
      wherein each of the PSPP elements is disposed above a surface of a single waveguide core in a longitudinal alignment with the waveguide core; and
      wherein each of the PSPP elements is configured with a width approximately equivalent to the width of the heating spot.

2. The apparatus of claim 1, further comprising:
   a plasmonic metal cap disposed above PSPP elements and coupled to the PSPP elements.

3. The apparatus of claim 2, wherein the plasmonic metal cap is configured with a straight edge aligned with the air bearing surface.

4. The apparatus of claim 2, wherein the plasmonic cap is configured with a thickness sufficient for a heat sink to control peak temperature of the near field transducer.

5. The apparatus of claim 2, wherein the plasmonic cap is configured with a variable thickness.

6. The apparatus of claim 2, wherein the plasmonic cap is configured with a flat surface for coupling to the PSPP elements.

7. The apparatus of claim 1, wherein a gap exists between each of the plurality of PSPP elements and the corresponding surface of the respective waveguide.

8. The apparatus of claim 1, wherein each of the PSPP elements is substantially linear and comprises a first end and a second end, wherein the first ends of all PSPP elements are connected together at a junction point near the air bearing surface with at least a portion of the junction exposed on the air bearing surface.

9. The apparatus of claim 8, further comprising a PSPP element extension configured to be perpendicular with the air bearing surface extending from the junction of PSPP elements.

10. The apparatus of claim 1, wherein more than one PSPP element is disposed along at least one of the waveguide cores.

11. The apparatus of claim 4, wherein the plurality of waveguide cores and corresponding PSPP elements are configured in three dimensional arrangement with respect to the air bearing surface.

12. The apparatus of claim 1, wherein the plurality of PSPP elements provides constructive interference of the incident light energy at the target.

13. A magnetic storage disk drive, comprising:
a rotatable magnetic storage disk;
a laser diode;
a plurality of dielectric waveguide cores configured to receive incident light energy from an energy source and direct the incident light energy to a target; and
a near field transducer formed at an air bearing surface of a magnetic recording device and configured to focus the light energy received from the plurality of waveguide cores and to transmit the focused light energy onto the storage disk surface to generate a heating spot on the storage disk, the near field transducer comprising:
  a plurality of propagating surface plasmon polariton (PSPP) elements configured as plasmonic metal ridges;
  wherein each of the PSPP elements is disposed above a surface of a single waveguide core in a longitudinal alignment with the waveguide core; and
  wherein each of the PSPP elements is configured with a width approximately equivalent to the width of the heating spot.

* * * * *